United States Patent

Gottauf

[15] 3,667,528
[45] June 6, 1972

[54] SPIKE FOR MOTOR VEHICLE TIRES

[72] Inventor: Georg Gottauf, Munich, Germany

[73] Assignee: Stahlgruber Otto Gruber & Company, Munich, Germany

[22] Filed: July 10, 1970

[21] Appl. No.: 53,838

Related U.S. Application Data

[63] Continuation-in-part of Ser. No. 736,616, June 13, 1968, Pat. No. 3,545,515.

[30] Foreign Application Priority Data

July 26, 1969 Germany......................P 19 38 091.7

[52] U.S. Cl...........................................................152/210
[51] Int. Cl.......................................................B60c 11/16
[58] Field of Search.................................................152/210

[56] References Cited

UNITED STATES PATENTS 3,464,476  9/1969  Scheuba et al.........................152/210

FOREIGN PATENTS OR APPLICATIONS 27,335  12/1911  Great Britain.........................152/210

*Primary Examiner*—James B. Marbert
*Attorney*—Connolly and Hutz

[57] ABSTRACT

Spike for motor vehicle tires comprises casing of synthetic material with reinforcing jacket embedded in casing. Hard metal pin is centrally disposed in reinforcing jacket. Jacket surrounds hard metal pin and includes pair of opposed side edge portions that overlap one another to form a seam. Alternatively, opposed side edge portions of reinforcing jacket may meet along line of contact which is curved and sloping relative to longitudinal axis of metal pin.

9 Claims, 12 Drawing Figures

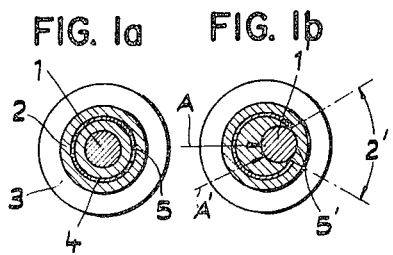
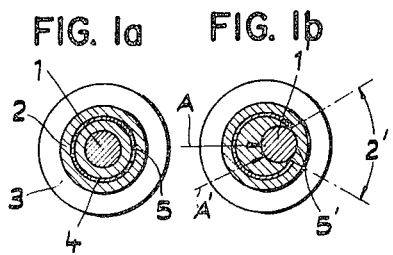
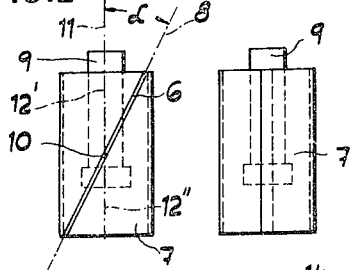
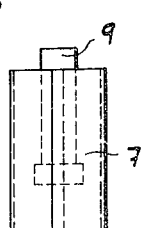
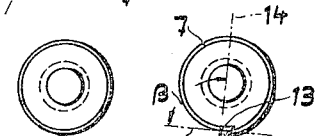
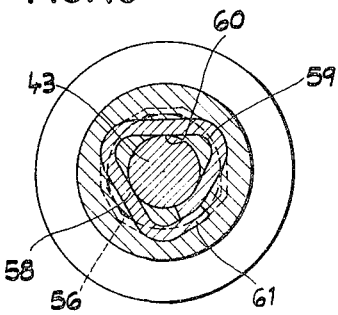
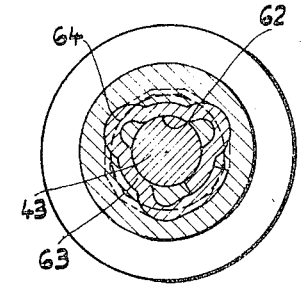
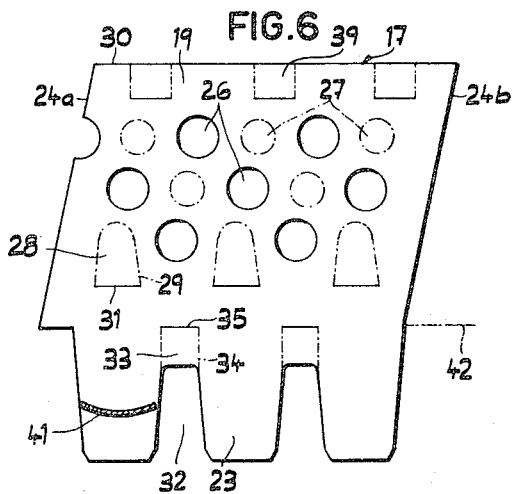
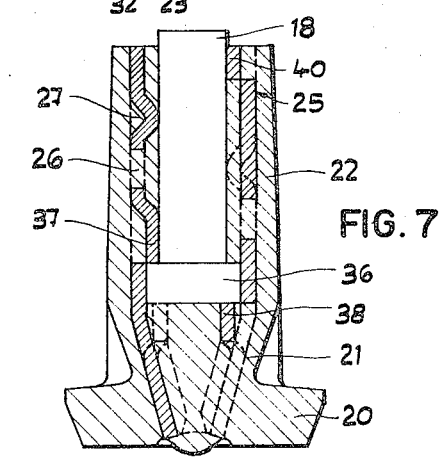
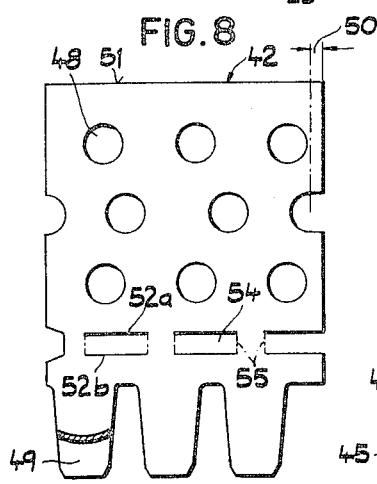
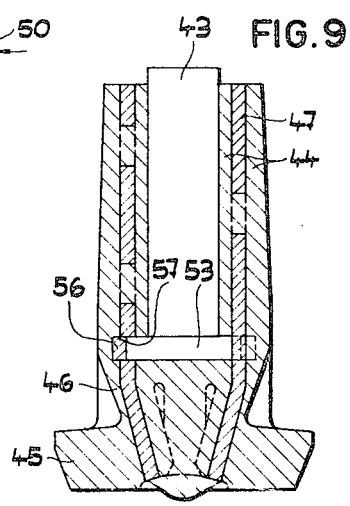

SPIKE FOR MOTOR VEHICLE TIRES

CROSS-REFERENCE TO RELATED APPLICATIONS

The present application is a continuation-in-part of copending application Ser. No. 736,616, filed June 13, 1968, now U.S. Pat. No. 3,545,515.

BACKGROUND OF INVENTION

The present invention relates to a so-called "spike" for motor vehicle tires. These spikes are pressed into holes distributed over the circumference of the tire tread to provide increased adhesive in ice and packed snow. The safety factor with regard to vehicles equipped with such tires is thereby increased. Application Ser. No. 736,616, filed June 13, 1968, relates to a spike for motor vehicle tires. A hard metal pin is embedded in synthetic material that forms the stem and anchoring base of the spike. A reinforcing jacket is also embedded in the synthetic material, and a hard metal pin is centrally located in the reinforcing jacket. With the above as background, the present invention specifically relates to a tire spike including a particular reinforcing jacket having increased resistance to deformation caused by excessive forces acting upon the hard metal pin.

From a practical standpoint a basket-shaped hollow cylindrical jacket acting as a sheathing or reinforcement is usually constructed by bending or rolling a sheet metal blank. Such fabricating techniques result in a slit, crevice, or at least a line of contact between the longitudinal edges of the sheet metal blank. Closing the line of contact by soldering, welding, or the like is not done because of the costs involved in such an operation. When the line of contact between the longitudinal edges of the sheet metal blank is in line with the forces acting upon the hard metal pin, deformation of the reinforcing jacket often occurs.

Tire spikes are usually pressed into openings in the tire by means of automatic machinery constructed for this purpose. Each spike is "sealed in" to a certain extent and it is impossible to adjust it so that the line of contact between the longitudinal edges of the sheet metal blank forming the reinforcing jacket is orientated in any predetermined manner. Preoreintation of the tire spikes is of little effect in preventing deformation of the jacket since the forces acting upon the spike during operation of the vehicle have different directions depending upon whether the vehicle is driven upon a smooth or bumpy road. Also, the condition of the road, whether it be straight or curved, affects the direction of the force acting upon the tire spike. Braking and accelerating also affect the lines of these forces. In practice, it is therefore impossible to orient the reinforcing jacket so that the seam therein is out of the line of the forces acting upon the hard metal pin.

Accordingly, it is an object of the present invention to provide a tire spike which avoids the above disadvantages and which functions in a highly satisfactory and beneficial manner over extended periods of time.

SUMMARY OF INVENTION

In accordance with the present invention a spike for motor vehicle tires comprises a casing of synthetic material with a reinforcing jacket embedded in the casing. A hard metal pin is centrally disposed in the reinforcing jacket, the reinforcing jacket includes a pair of opposed side edge portions to overlap one another to form a seam.

The seam of the reinforcing jacket may have a linear orientation which is parallel to the longitudinal axis of the hard metal pin. Also, the reinforcing jacket may include positioning structure for centering the metal pin. The cross-section of the reinforcing jacket can be substantially circular or triangular with rounded corners.

In another embodiment of the present invention the opposed side edge portions of the reinforcing jacket meet one another along a line which is curved and sloping relative to the longitudinal axis of the hard metal pin. The reinforcing jacket may have a substantially circular cross-section, and positioning structure can be provided for centering the hard metal pin.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein:

FIGS. 1a and b illustrate a reinforcing jacket according to the prior art wherein the opposed side edge portions of the jacket meet one another along a line which is parallel to the longitudinal axis of the metal pin;

FIG. 2 is a front elevational view of a reinforcing jacket and hard metal pin according to the present invention;

FIG. 3 is a top plan view of the jacket and pin of FIG. 2;

FIG. 4 is a front elevational view of another reinforcing jacket and hard metal pin according to the present invention;

FIG. 5 is a top plan view of the jacket and pin of FIG. 4;

FIG. 6 is a plan view of the blank used to fabricate a reinforcing jacket according to the present invention;

FIG. 7 is a sectional view of a tire spike according to the present invention including the reinforcing jacket of FIG. 6;

FIG. 8 is a plan view of the blank used to fabricate another reinforcing jacket according to the present invention;

FIG. 9 is a sectional view of a tire spike according to the present invention including the reinforcing jacket of FIG. 8;

FIG. 10 is a cross-sectional view through the tire spike of FIG. 9; and

FIG. 11 is a cross-sectional view similar to FIG. 10 illustrating a slightly different reinforcing jacket.

DETAILED DESCRIPTION

In the schematic illustration of FIGS. 1a and b, a hard metal pin 1 is embedded in a synthetic material casing forming a stem 2 and anchoring base 3. A reinforcing jacket made from a sheet metal blank and having a vertically extending slot 5 is embedded in the casing. When the tire rolls on a roadway, a force A is exerted on the end of the hard metal pin protruding over the frontal surface of the stem. It may happen that the hard metal pin reaches the position 1' and bends the jacket during enlargement of slot 5'. This may lead to tearing of the casing in the area 2'. The same or similar result may also occur when the hard metal pin is not forced to the position 1' but a corresponding force is exerted on the synthetic material located between the pin and the reinforcing jacket. Similar adverse effects may also occur even if the effective line of the force does not pass through the slot 5, i.e. if it occurs in the direction A', for example. In this connection, it is of little consequence where the slot 5 is located since the forces that act on the pin have an infinite number of directions, for reasons discussed above.

When the line of contact between the opposed edge portions of the jacket 7 as is shown in FIGS. 2 and 3, bending of the jacket is effectivey prevented since a radial force acting in any direction on the metal pin 9 can only act against the line of contact over a very small distance (point 10). Often the forces act against the jacket at points such as 12' or 12" where the jacket has significant resistance to deformation. The orientation of the line of contact is such that a plane 8 passing therethrough intersects any plane passing through the center axis of the metal pin 9 and at least one point along the line of contact. In other words, planes 8 and 11 intersect at an angle $\alpha$ greater than zero. The line of contact in FIGS. 2 and 3 is curved and inclined relative to the center axis of pin 9.

In the embodiment shown in FIGS. 4 and 5, the plane 14, passing through the center axis of the hard metal pin 9 and at least one point 13 —in this instance actually a point line — traverses plane 15 passing through the line of contact. In this arrangement, there is an overlapping seam 16 between the opposed side edges of the reinforcing jacket, and a force exerted on jacket 7 over the hard metal pin 9 may, even if it acts in the direction of the seam, act only on the point of overlapping having a double cross-section. Bending of the jacket 7 is therefore effectively prevented.

In an example transforming the invention to practice and described with reference to FIGS. 6 and 7, the reinforcing jacket 25 is rolled or otherwise formed from a sheet metal blank 17. The blank consists of a jacket section 19 surrounding the hard metal pin 18 of the tire spike for centering the pin and holding it. Several tongues reinforce the base 20 of the spike and the transition 21 from the base to the stem 22.

The longitudinal edges 24a and 24b of the sheet metal blank 17 are cut at a slant, as shown in FIG. 6, so that in rolling the reinforcing jacket 25, a transverse line of contact is provided between the edges 24a and 24b, as shown in FIG. 2. Round holes or the like 26 provide perforations through synthetic material penetrates during application of the hard material to the hard metal pin. Spherical indentations 27 which center the hard metal pin. In the example shown, the centers of the alternating perforations 26 and indentations 27 are situated on lines running parallel to the longitudinal edges 24.

The indentations 28 of the lowest row differ from the indentations 27. Indentations 28 comprise unusually bend portions 29 and cuts 31. In the same manner, the spaces 32 between the tongues 23 are extended to form indentations 33 located between indentations 28. Indentations 33 include bent edges 34 and cuts 35.

As illustrated in FIG. 7 a flange 36 on the hard metal pin 18 is secured against axial movement by lugs 37 formed by indentations 28 and lugs 38 formed by indentations 33. Indentations 39 provided at the upper end of blank 17 form lugs 40 for centering and holding the hard metal pin at the upper rim of the reinforcing jacket. The indentations 28, 33, and 39 in the reinforcing jacket form lugs that firmly hold in pin in both vertical as well as in the horizontal directions. The curved and inclined line of contact between the edges 24a and 24b prevents deformation of the reinforcing jacket when forces are applied to the hard metal pin during use of the tire in which the pin is located.

Tongues 23 are bent independent of the rolling or bending of part 19, as shown by 41, so that when bent inwardly as in FIG. 7, somewhat along the bending edge 42, the tongues have a circular ring cross-section similar to the transition area 21.

A practical embodiment of the invention following the novel principle according to FIGS. 4 and 5 is illustrated in FIGS. 8 to 11. For this purpose, a sheet metal blank 42 according to FIG. 8 forms the reinforcing jacket 47. The jacket holds and centers the hard metal pin 43. The jacket also supports the stem 44, base 45 and transition area 46 of the casing. The sheet metal blank has circular or other shaped openings 48 for the penetration of the synthetic material forming the casing during the application of the material. When the blank 42 is formed into the reinforcing jacket the opposed side edge portions overlap one another by the distance 50 illustrated in FIG. 8. The overlapping edges prevent bending of the reinforcing jacket when forces are applied to the pin 43.

At a respective distance from the upper edge 51 of the sheet metal blank 42 and proceeding at right angles to its longitudinal extension and directly over tongues 42, cuts 52a and 52b are provided whose distance corresponds to the height of the flange 53 of the hard metal pin 43. The cross-piece 54 resulting from cuts 52, as shown by FIG. 9, are pressed out during stretching of the material around the bending edges 55 in such a manner that shoulders 56 result which center the flange 53 of the hard metal pin and hold the pin from axial movement by the cutting edges 57.

According to FIG. 10, blank 42 is formed into a reinforcing jacket having a triangular cross-section with rounded corners. The distance between a leg 58 and a rounded opposite corner 59 is such that for the hard metal pin 43 there result centering surfaces 60, which, when extended over the entire length of the pin with the exception of its foot, render special centering indentations unnecessary.

Suitably, the overlapping 61 is placed in such a manner that it conforms to the outer surface of the pin 43.

Also, in the cross-sectional example according to FIG. 11, the sheet metal blank 51 is rolled or bent in such a manner that centering surfaces 62 conforming to the pin result over the height of the hard metal pin 43. With the exception of its flange 53. Shoulders 64 between the adjoining areas 63, between the inner surface of which and the outer surface of the hard metal pin the synthetic material substance enters during spraying, provide the reinforcing and sheathing of the synthetic material casing.

What is claimed is:

1. A spike for motor vehicle tires comprising a casing of synthetic material, a reinforcing jacket embedded in the casing, and a hard metal pin centrally disposed in the reinforcing jacket, the reinforcing jacket including a pair of opposed side edge portions that overlap one another to form a seam.

2. A spike as in claim 1 wherein the seam has a linear orientation which is parallel to the longitudinal axis of the hard metal pin.

3. A spike as in claim 2 wherein the reinforcing jacket includes positioning means for centering the hard metal pin.

4. A spike as in claim 2 wherein the reinforcing jacket has a substantially circular cross-section.

5. A spike as in claim 2 wherein the reinforcing jacket has a substantially triangular cross-section with rounded corners.

6. A spike for motor vehicle tires comprising a casing of synthetic material, a reinforcing jacket embedded in the casing, and a hard metal pin centrally disposed in the reinforcing jacket, the reinforcing jacket including a pair of opposed side edge portions that meet one another at least along a line of contact arranged with respect to the longitudinal axis of the hard metal pin whereby a plane passing through the line of contact cuts across a plane passing through the longitudinal axis of the metal pin and at least one point along the line of contact.

7. A spike as in claim 6 wherein the line of contact is a curved sloping line relative to the longitudinal axis of the hard metal pin.

8. A spike as in claim 7 wherein the reinforcing jacket includes positioning means for centering the hard metal pin.

9. A spike as in claim 7 wherein the reinforcing jacket has a substantially circular cross-section.

* * * * *